(12) United States Patent
Amit et al.

(10) Patent No.: US 10,594,736 B1
(45) Date of Patent: *Mar. 17, 2020

(54) SELECTIVE TRAFFIC BLOCKAGE

(71) Applicant: CA, INC., San Jose, CA (US)

(72) Inventors: Yair Amit, Tel-Aviv (IL); Shahar Areli, Rishon LeZion (IL); Daniel Kandel, Tel-Aviv (IL); Elisha Eshed, Jerusalem (IL); Roy Iarchy, Rishon LeZion (IL); Adi Sharabani, Palo Alto, CA (US)

(73) Assignee: CA, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,483

(22) Filed: Jun. 22, 2018

Related U.S. Application Data

(63) Continuation of application No. 15/345,533, filed on Nov. 8, 2016, now abandoned.

(51) Int. Cl.
| | | |
|---|---|---|
| *H04L 29/06* | (2006.01) | |
| *H04L 12/46* | (2006.01) | |
| *H04L 29/12* | (2006.01) | |

(52) U.S. Cl.
CPC .......... *H04L 63/20* (2013.01); *H04L 12/4625* (2013.01); *H04L 12/4641* (2013.01); *H04L 63/0227* (2013.01); *H04L 63/0263* (2013.01); *H04L 63/0272* (2013.01); *H04L 63/14* (2013.01); *H04L 63/1433* (2013.01); *H04L 63/1441* (2013.01); *H04L 61/1511* (2013.01)

(58) Field of Classification Search
CPC . H04L 63/20; H04L 12/4641; H04L 63/1433; H04L 12/4625; H04L 63/1441; H04L 63/0272; H04L 63/0227; H04L 63/14; H04L 63/0263; H04L 61/1511
See application file for complete search history.

(56) References Cited

U.S. PATENT DOCUMENTS

| | | | |
|---|---|---|---|
| 9,565,202 B1 * | 2/2017 | Kindlund | H04L 63/1441 |
| 2004/0123139 A1 * | 6/2004 | Aiello | H04L 63/0227 713/154 |
| 2008/0086768 A1 * | 4/2008 | Mirza-Baig | H04L 63/0227 726/13 |
| 2012/0155325 A1 * | 6/2012 | Eichen | H04L 12/4633 370/254 |
| 2013/0031599 A1 * | 1/2013 | Luna | G06F 21/554 726/1 |
| 2014/0032691 A1 * | 1/2014 | Barton | H04L 41/00 709/206 |

(Continued)

*Primary Examiner* — Cheng-Feng Huang
(74) *Attorney, Agent, or Firm* — FisherBroyles, LLP

(57) ABSTRACT

Method, product and device for selective traffic blockage. In one embodiment, in response to a detection that a computing device cannot connect to a predetermined server, the blockage policy is applied to an outgoing packet, whereby selectively blocking outgoing packets when the computing device has limited connectivity to the predetermined server. In another embodiment, in response to an attempt to transmit a packet, invoking a local Virtual Private Network (VPN) service that is configured to apply a blockage policy, wherein the local VPN service provides an Application Programming Interface (API) of a VPN service. As a result, selective blockage is implemented using the local VPN service.

26 Claims, 7 Drawing Sheets

(56) References Cited

U.S. PATENT DOCUMENTS

| | | | |
|---|---|---|---|
| 2015/0113629 A1* | 4/2015 | Park | H04L 63/02 |
| | | | 726/13 |
| 2016/0044723 A1* | 2/2016 | Sergeev | H04L 69/08 |
| | | | 370/252 |
| 2016/0269380 A1* | 9/2016 | Kishida | H04L 63/08 |
| 2016/0308907 A1* | 10/2016 | Le | H04L 12/4641 |
| 2017/0093891 A1* | 3/2017 | Mitchell | H04L 63/1416 |
| 2017/0310686 A1* | 10/2017 | Ray | H04L 63/08 |

* cited by examiner

SELECTIVE TRAFFIC BLOCKAGE

CROSS-REFERENCE TO RELATED APPLICATIONS

This application is a continuation of U.S. patent application Ser. No. 15/345,533, filed on Nov. 8, 2016, which is herein incorporated by reference.

BACKGROUND

Field

The present disclosure relates to cyber security, in general, and to securing outgoing communications in a device, in particular.

Description of the Related Art

Network-based attacks are a well known threat to personal computers and mobile devices. Its impact on mobile devices is especially significant as those tend to connect more frequently to Wi-Fi networks. Network attacks such as man-in-the-middle can expose sensitive end user information such as passwords and other personal data.

When a device is suspected as being under attack, one known solution is to disconnect the device from the network. Such an approach does protect sensitive information. However, it has a significant downside in impacting user productivity and disabling the ability to bypass the attack. In addition, some networks such as captive networks, exhibit suspicious behaviors that are resolved once the user authenticates to them. Disconnecting the user from these networks on first sight of a suspicious activity will make it impractical for the user to authenticate and use the networks as intended.

An additional approach could be to use a secure Virtual Private Network (VPN) channel from the device to protect the data transmitted from any man-in-the-middle in the local network. However, establishing a VPN channel requires some Internet connectivity and in the absence of such connectivity, no VPN channel can be created.

SUMMARY

One exemplary embodiment of the disclosed subject matter is a method performed by a computing device, wherein the computing device comprising a processor, wherein the method comprises: detecting that the computing device cannot connect to a predetermined remote server; and in response to said detecting, applying a blockage policy on an outgoing packet, wherein the computing device is attempting to send the outgoing packet towards an external device, wherein the blockage policy is configured to selectively block outgoing packets based on a content of a packet or based on a target destination of the packet, whereby selectively blocking outgoing packets when the computing device has limited connectivity to the predetermined server.

Optionally, said applying the blockage policy is performed by operating a local Virtual Private Network (VPN) service, wherein the local VPN service is configured to apply the blockage policy without attempting to establish a VPN channel, wherein the local VPN service provides an Application Programming Interface (API) of a VPN service.

Optionally, said blockage policy is based on a predetermined host name; wherein the local VPN service is provided with an Internet Protocol (IP) address of the external device and is unaware of a host name of the external device; wherein prior to said analyzing, resolving the predetermined host name using a Domain Name Server (DNS) service to obtain one or more IP addresses of the predetermined host name; and wherein the blockage policy are applied by comparing the IP address of the external device with the one or more IP addresses of the predetermined host name.

Optionally, the predetermined remote server is a VPN server, wherein the computing device is connected to a malicious network, wherein the malicious network blocks communication to the VPN server.

Optionally, the predetermined remote server is a Virtual Private Network (VPN) server, whereby the computing device is unable to establish a VPN channel.

Optionally, said detecting comprises detecting that the computing device having limited connectivity to the Internet.

Optionally, the computing device is connected to a captive network having a captive portal, whereby attempting to access the predetermined remote server is blocked by the captive network, wherein the captive network is configured to redirect the mobile computing device to the captive portal.

Optionally, the method further comprising: determining that the mobile device is under a potential threat; and wherein said detecting is performed in response to said determining.

Optionally, said applying the blockage policy is performed by operating a local Virtual Private Network (VPN) service, wherein the local VPN service is configured to apply the blockage policy and to attempt to establish a VPN channel.

Optionally, the method further comprising: the VPN service initially applying the blockage policy; the VPN service attempting to establish the VPN channel; in response to the VPN channel being established, stopping to apply the blockage policy.

Another exemplary embodiment of the disclosed subject matter is a computer program product retained on non-transitory computer readable medium, wherein the computer program product comprising: a VPN service configured to be retained on local memory of a computing device; wherein the VPN service implementing an Application Programming Interface (API) of a generic VPN service useful for establishing a VPN channel; wherein the VPN service comprises instructions, which instructions when executed by a processor cause the processor to: obtain an outgoing packet, wherein the outgoing packet is indicated to be transmitted by the computing device towards an external device; apply a blockage policy on the outgoing packet, wherein the blockage policy is configured to selectively block outgoing packets; and based on the blockage policy, prevent the outgoing packet from being transmitted, whereby the outgoing packet is blocked; whereby selectively blocking outgoing packets by the VPN service based on the blockage policy.

Optionally, the blockage policy is configured to selective block the outgoing packet based on at least one of the following: a content of the outgoing packet; a target destination of the outgoing packet; and a computer application transmitting the outgoing packet.

Optionally, the product further comprising instructions that are configured to cause the processor, when executed, to detect a potential threat to the computing device, wherein the blockage policy is applied in response to a detection of a potential threat.

Optionally, the product further comprising instructions that are configured, when executed, to cause the processor to: detect whether a VPN server is accessible over a network; apply the blockage policy in response to the VPN server not being accessible.

Optionally, said instructions are further configured to cause the processor to: determine a blocking decision based on the blockage policy; based on the blocking decision being to not block the outgoing packet, transmit the outgoing packet; and wherein the prevention of the outgoing packet from being transmitted is performed based on the blocking decision being to block the outgoing packet.

Optionally, the product further comprising instructions that are configured, when executed, to cause the processor to: detect whether a VPN server is accessible over a network; in response to a determination that the VPN server is accessible, establish a VPN channel using the VPN server; and in response to the VPN channel being established, stop applying the blockage policy and allow outgoing packets to be transmitted via the VPN channel.

Optionally, the product further comprising: instructions that are configured, when executed, to cause the processor to determine an estimated threat level from a computer application transmitting the outgoing packet; wherein the blockage policy is configured to selectively block the outgoing packet based on the estimated threat level being above a threshold.

Optionally, a computer application transmitting the outgoing packet is configured to perform a malicious activity, wherein the blockage policy is configured to selectively block the outgoing packet based on an identification of the computer application as being configured to perform a malicious activity.

Optionally, the computer program is selected from the group consisting of: a malicious computer application; a computer application infected with a virus; and a computer application having a vulnerability that is exploitable for malicious activity.

Optionally, the product further comprising instructions that are configured, when executed, to cause the processor to perform: automatically identifying a computer program as a potential threat; transmitting an alert notification to a user based on the automatic identification; and wherein the blockage policy is configured to prevent the computer program from sending any outgoing packet before the user acts on the alert notification.

Optionally, the product further comprising: instructions that are configured, when executed, to cause the processor to determine an estimated threat level from a computer device executing the computer program product; wherein the blockage policy is configured to selectively block the outgoing packet based on the estimated threat level being above a threshold.

Optionally, the estimated threat level is based on whether the computer device is complaint with a set of rules set by an organization.

Yet another exemplary embodiment of the disclosed subject matter is a method performed by a computing device, wherein the computing device comprising a processor, wherein the method comprises: in response to a computer program that is executed by the computing device attempting to transmit an outgoing packet, invoking a local Virtual Private Network (VPN) service, wherein the local VPN service is configured to apply a blockage policy, wherein the local VPN service provides an Application Programming Interface (API) of a VPN service; applying, by the local VPN service, the blockage policy on the outgoing packet, wherein the blockage policy is configured to selectively block outgoing packets, whereby selectively blocking outgoing packets using the local VPN service.

Optionally, the blockage policy is configured to selectively block the outgoing packet based on the computer program.

Optionally, the blockage policy is configured to selectively block the outgoing packet based on an estimated threat level associated with the computer program.

Optionally, the method further comprises: identifying a potential threat from the computer program; and wherein the blockage policy is configured to block all outgoing packets issued by the computer program as long as the potential threat is present.

Optionally, the method further comprises: identifying a potential threat from the computer program; providing an alert notification to a user informing of the user of the potential threat from the computer program; wherein the blockage policy is configured to block all outgoing packets issued by the computer program until the user acts on the alert notification.

Optionally, the user acts on the alert notification by decommissioning the computer program.

Optionally, the user acts on the alert notification by dismissing the alert notification, whereby outgoing packets issued by the computer program after the alert notification is dismissed are transmitted by the local VPN service.

Optionally, the blockage policy is configured to selectively block the outgoing packet based on an estimated threat level associated with the computing device.

Optionally, the method further comprising determining a compliance level of the computing device with one or more rules of an organization, wherein the blockage policy is configured to selectively block the outgoing packet based on the determined compliance level.

Yet another exemplary embodiment of the disclosed subject matter is a computing device having a processor, the processor being adapted to perform: detecting that the computing device cannot connect to a predetermined remote server; and in response to said detecting, applying a blockage policy on an outgoing packet, wherein the computing device is attempting to send the outgoing packet towards an external device, wherein the blockage policy is configured to selectively block outgoing packets based on a content of a packet or based on a target destination of the packet, whereby selectively blocking outgoing packets when the computing device has limited connectivity to the predetermined server.

Optionally, said applying the blockage policy is performed by operating a local Virtual Private Network (VPN) service, wherein the local VPN service is configured to apply the blockage policy without attempting to establish a VPN channel, wherein the local VPN service provides an Application Programming Interface (API) of a VPN service.

Optionally, said blockage policy is based on a predetermined host name; wherein the local VPN service is provided with an Internet Protocol (IP) address of the external device and is unaware of a host name of the external device; wherein prior to said analyzing, resolving the predetermined host name using a Domain Name Server (DNS) service to obtain one or more IP addresses of the predetermined host name; and wherein the blockage policy are applied by comparing the IP address of the external device with the one or more IP addresses of the predetermined host name.

Optionally, the predetermined remote server is a VPN server, wherein the computing device is connected to a malicious network, wherein the malicious network blocks communication to the VPN server.

Optionally, the predetermined remote server is a Virtual Private Network (VPN) server, whereby the computing device is unable to establish a VPN channel.

Optionally, the computing device is connected to a captive network having a captive portal, whereby attempting to access the predetermined remote server is blocked by the captive network, wherein the captive network is configured to redirect the mobile computing device to the captive portal.

Optionally, the processor being adapted to perform: determining that the mobile device is under a potential threat; and wherein said detecting is performed in response to said determining.

Yet another exemplary embodiment of the disclosed subject matter is a computing device having a processor, the processor being adapted to perform: in response to a computer program that is executed by the computing device attempting to transmit an outgoing packet, invoking a local Virtual Private Network (VPN) service, wherein the local VPN service is configured to apply a blockage policy, wherein the local VPN service provides an Application Programming Interface (API) of a VPN service; applying, by the local VPN service, the blockage policy on the outgoing packet, wherein the blockage policy is configured to selectively block outgoing packets, whereby selectively blocking outgoing packets using the local VPN service.

Optionally, the blockage policy is configured to selectively block the outgoing packet based on the computer program.

Optionally, the blockage policy is configured to selectively block the outgoing packet based on an estimated threat level associated with the computer program.

Optionally, the processor is further adapted to perform: identifying a potential threat from the computer program; and wherein the blockage policy is configured to block all outgoing packets issued by the computer program as long as the potential threat is present.

Optionally, the processor is further adapted to perform: identifying a potential threat from the computer program; providing an alert notification to a user informing of the user of the potential threat from the computer program; wherein the blockage policy is configured to block all outgoing packets issued by the computer program until the user acts on the alert notification.

Optionally, the blockage policy is configured to selectively block the outgoing packet based on an estimated threat level associated with the computing device.

Optionally, the processor is further adapted to perform: determining a compliance level of the computing device with one or more rules of an organization, wherein the blockage policy is configured to selectively block the outgoing packet based on the determined compliance level.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
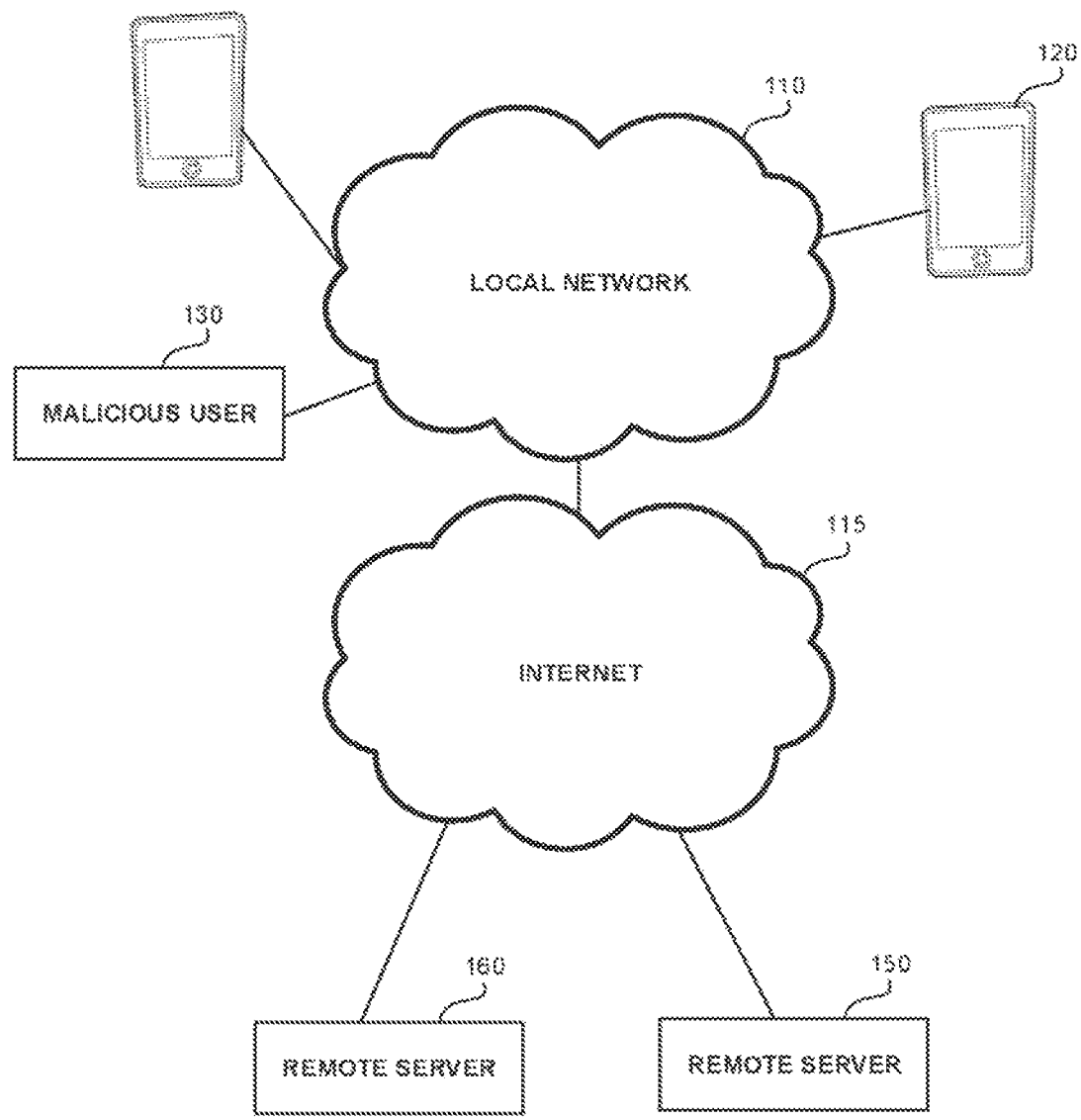
FIG. 1 shows an illustration of a computerized environment, in accordance with some exemplary embodiments of the disclosed subject matter.

One technical problem dealt with by the disclosed subject matter is protecting against network threats. In some exemplary embodiments, the disclosed subject matter is aimed at mitigating the risk of man-in-the-middle attacks that are performed by a malicious entity present in the local network, without drastically deteriorating the user experience.

In some cases, the device may be under limited connectivity conditions, and in particular unable to connect to a designated VPN server useful for establishing a VPN channel. Limited connectivity can be, for example, a result of a targeted attack that tries to circumvent VPN server protection of any kind. Additionally or alternatively, the network to which the device is connected may be a network that intentionally limits Internet connectivity. As an example, a captive network, which operates a captive portal, may exhibit such a condition. The captive network may be configured to block Internet connectivity until the user is authenticated in the captive portal. The captive network may intercept observed packets until such time as the user is authorized. Additionally or alternatively, the captive network may repeatedly redirect each networking attempt to the captive portal. In some cases, the captive network may perform Secure Sockets Layer (SSL) decryption as part of its captive portal. As a result, the captive network may be identified as performing potential malicious activity and be considered a potential threat.

In some cases, a VPN channel may be established and used to transmit secure communications. However, tunneling packets via the VPN channel may not be desired in some cases, such as in view of privacy issues. The user may not want to expose her private content to the VPN operator, such as her employer, and as a result, the user may prefer to avoid using the VPN channel for some packets. In other cases, communications between the time the attempt to establish a VPN channel begins and the time the VPN channel is actually established and becomes operational, may be under a potential risk. In such cases, there may be a need to provide a complementary protection scheme until the VPN channel becomes operational, preferably without drastically deteriorating user experience.

Another technical problem dealt with by the disclosed subject matter is to protect the device from malicious apps. In some cases, after a malicious app is identified, a notification may be issued to the user. However, until the user addresses the risk and preferably deletes the malicious app, such app may continue to operate and pose a risk to the device. In some cases, a malicious app may be configured to transmit information to a remote server, such as a server gathering sensitive data extracted from the device. Additionally or alternatively, a malicious app may be controlled remotely via a Command and Control (C&C) channel. Commands to the malicious app from the malicious user may be sent via the C&C channel and the outcome may be transmitted back via the same channel. In some cases, the C&C channel may be composed of several channels, such as an incoming channel and an outgoing channel.

Yet another technical problem dealt with by the disclosed subject matter is to enable restricting access to predetermined resources, such as corporate resources that are accessed via a communication channel. In some cases, users may use their own devices. Each device may be assessed of threat level. In some cases, it may be desired to block devices with relatively high threat levels from accessing the predetermined resources, while allowing the device to continue its general operation uninterrupted.

One technical solution may be to employ a selective blockage policy to protect the device from the security threat. Some outgoing packets may be blocked according to a blockage policy. The policy may be applied after and in response to determining that a predetermined remote server, such as a VPN server required to establish a secured VPN channel, is not accessible from the device. The policy may depend on the content of the packets. As an example, the policy may indicate confidential data, detect confidential data in an outgoing packets, and block such packet based on its content. In such a manner, the policy may prevent confidential data from leaking outside the device in an unsafe environment. Additionally or alternatively, the policy may depend on the target of the packet. As an example, communications directed at specific hosts, such as an email server, can be blocked. For instance, if a user would like to make sure her Gmail™ and Facebook™ credentials are never transmitted over a malicious network, she can define these hosts (e.g. gmail.com or facebook.com) as sensitive and have the traffic to them blocked on the device when connected to a potentially malicious network. Additionally or alternatively, an IT administrator may define as a corporate policy blocking communications towards the corporate email servers in the organization when a threat is detected.

In some exemplary embodiments, the blockage policy may be established and utilized between the time a threat is detected and before a secure VPN channel is established and can be used. Additionally or alternatively, the blockage policy may be used even if a VPN channel is established to prevent tunneling of confidential information via a VPN of a VPN provider. Such may be the case when the user defines confidential information that should not be disclosed to the VPN provider.

In some exemplary embodiments, the disclosed subject matter may be implemented using a VPN service that locally resides on the computing device and is accessible irrespective of connectivity status of the device. Instead of connecting to a VPN, the VPN service may analyze the outgoing packet and decide whether to transmit it in a non-secure channel or drop it to prevent confidential information from being sent in an unsecure environment and potentially leaking. In some exemplary embodiments, the VPN service may be a service implementing an Application Programming Interface (API) of a generic VPN service. The VPN service may be a dummy VPN service which is never configured to establish a VPN channel. Additionally or alternatively, the VPN service may potentially establish a VPN channel, while still applying the blockage policy in some circumstances. In one example, blockage policy may be applied by the VPN service to prevent tunneling of confidential information. In such a case, if the blockage policy does not indicate that the packet should be blocked, the packet may be transmitted via the VPN. In another example, the blockage policy may be applied prior to the VPN channel being established. In such a case, if the blockage policy does not indicate that the packet should be blocked, the packet may be transmitted via an unsecure channel, through the potentially malicious network in which a threat was detected.

Another technical solution provided by the disclosed subject matter is to implement a blockage policy for specific apps. In some exemplary embodiments, once an app is identified and tagged as a potential malicious app, a notification may be provided to the user. Before the user acts on the notification, the blockage policy may be implemented for the app. In some exemplary embodiments, all outgoing communication of the app may be directed to a dummy VPN service, which may be configured to drop all packets instead of sending them. In such a manner, the threat level the app poses is reduced. For example, extracted information which the malicious app may have extracted from the device cannot be leaked to the owner of the malicious app. Additionally or alternatively, C&C channels may be rendered ineffective, as the app may be unable to acknowledge any commands request it received via such channel, may be unable to transmit outcome of the command, or the like. As an example, consider a malicious app which sends screenshots of the device on command. While the command may be reach the malicious app, the screenshot may not be transmitted back to owner of the malicious app, rendering her command ineffective.

Yet another technical solution may be to implement VPN-based selective blockage policy on the device based on the estimated threat level of the device. The threat level of the device may be estimated using predetermined rules, machine learning techniques, or other automatic manner. Based on the threat level being above a threshold, the selective blockage policy may be implemented. The selective blockage policy may utilize a VPN service to analyze outgoing communication packets and to block packets directed at predetermined resources, such as corporate email server, corporate file storage, or the like. Such a selective blockage policy prevents access to the potentially confidential information, without affecting user experience from using the device for other activities, such as personal activities that are not associated with the corporate information. As an example, the user may continue to browse the Internet and access her private email account, while being blocked from accessing her corporate email account. In some exemplary embodiments, the selective blockage policy may be implemented as long as a secured VPN channel is not yet established. Additionally or alternatively, if the threat level is above a certain threshold, the device may not be trusted even if the VPN channel is established. As an example, the threat level may indicate that there's a likelihood above an acceptable likelihood that the device does not belong to a member of the organization. In such a case, the device may be blocked from accessing all organization resources irrespective of whether a VPN channel was established or not.

One technical effect of utilizing the disclosed subject matter may be to provide for protection to having credentials leaked or content manipulated, regardless of the sophistication of the network attack.

Another technical effect may be allowing the user to still connect to and use captive networks as a source for network connectivity. The user may still use such a network, connect to it, browse to the captive portal, and login thereto. After the login, the detected potential threat may no longer be detected, and the blockage policy may no longer be applied. Additionally or alternatively, after the login, Internet connectivity may be provided, and a VPN server may be connected to and used for establishing a secure channel outbound from the device.

Yet another technical effect may be mitigating the risk of an attack directed at blocking the device's connectivity to the VPN servers. In such a case, the device may simply avoid sending confidential information until the threat stops.

Yet another technical effect may be mitigating the risk of leakage of confidential information to a VPN provider.

Yet another technical effect may be mitigating the risk of leakage of confidential information before a VPN channel can be established, such as in case of a long communication delay between the device and the VPN server, which may cause a delay before an operational VPN channel can be used.

Yet another technical effect may be mitigating the risk of leakage of confidential information from a user device based on a potential risk assessment thereof. In some exemplary embodiments, the disclosed subject matter may provide for control access to sensitive resources based on corporate policy, security posture, or the like.

Yet another technical effect may be circumventing malicious activity by apps that are identified as malicious apps before the user is able to respond to the threat. For example, the malicious app's activity may be circumvented before the user is able to uninstall it. As a result, the potential threat is automatically removed even without user proactive feedback and in a sandboxed environment.

Referring now to FIG. 1 showing an illustration of a computerized environment, in accordance with some exemplary embodiments of the disclosed subject matter.

In some exemplary embodiments, a Device 120 may be a computing device such as a computer, a laptop, a mobile computing device, a smart phone, a Personal Digital Assistant (PDA), or the like. Device 120 may be configured to download, install and execute applications. In some exemplary embodiments, Device 120 may be connected to a Local Network 110, such as a Local Area Network (LAN), Wi-Fi, a cellular cell tower, or the like. Local Network 110 may be connected to a network, such as intranet, Wide Area Network (WA), the Internet or the like, thereby providing connectivity for devices, such as Device 120, connected thereto. In FIG. 1 and for clarity purposes only the network is referred to as Internet 115.

A Malicious User 130 may be a device operated with malicious intent that is connected to Local Network 110 and poses a potential threat. The potential threat may be identified by Device 120, by another device (not shown) probing Local Network 110 for threats, or the like. In some exemplary embodiments, a potential threat may be assumed to be present in view of past detection(s) of potential threats in Local Network 110. It will be understood, that Malicious User 130 may not be present and still a potential threat may be detected. One such non-limiting example may be when Local Network 110 is a captive network, which may perform SSL decryption as part of its redirection process over HyperText Transfer Protocol (HTTP). However, it will be emphasized that the disclosed subject matter is not limited to any specific threat nor to a specific identification manner. It will be further noted that Malicious User 130 may not be connected directly to Local Network 110, but rather Malicious User 130 may be connected to Internet 115 and via such connection, be connected to Device 120.

In some exemplary embodiments, Device 120 may operate under limited connectivity condition. In some exemplary embodiments, Local Network 110 may be disconnected from Internet 115 altogether, may actively block access thereto (e.g., such as in case of a captive network prior to user login). Additionally or alternative, Device 120 may generally have access to Internet 115, under some restrictions. As an example, connectivity to Remote Server 150 may be specifically blocked, while still being able to connect to Remote Server 160. In some exemplary embodiments, the limited connectivity may be an outcome of the Malicious User 130 specifically targeting and blocking packets to Remote Server 150. Additionally or alternative, Remote Server 150 may be disconnected and as a result may not be accessible by Device 120.

In some exemplary embodiments, Remote Server 150 may be a VPN server. A software VPN service may be implemented on Device 120 and retained in memory of Device 120. The VPN service may be operative to connect to VPN server in order to establish a VPN channel providing for a secure channel for communications over Local Network 110 and over the Internet 115. In some exemplary embodiments, the VPN channel may be a virtual point-to-point connection through the use of dedicated connections, virtual tunneling protocols, traffic encryption, or the like. In some exemplary embodiments, it may be desired that some confidential information will not be transmitted in a non-secure channel in general or in case of an identified potential threat. Device 120 may be configured to block packets that are to be transmitted if a VPN channel is not available. Additionally or alternatively, some confidential information may be kept in confidence from the owner of the VPN server, and as a result. Device 120 may therefore avoid tunneling the confidential information via the VPN channel. Additionally or alternatively, based on an estimated threat level from the device, the device may be blocked from accessing predetermined resources, such as corporate resources, which may be hosted on Remote Server 150.

In some exemplary embodiments, Device 120 may implement a blockage policy. The blockage policy may indicate rules for blocking packets on a communication channel. In some exemplary embodiments, different policies may be applied for different channels. Additionally or alternatively, different policies may be applied during different threat conditions (e.g., a more restrictive policy may be applied when a more hazardous risk is detected).

The blockage policy may be based on a content of a packet, such as whether the packet itself comprises confidential information. As an example, the content of the packet may be reviewed to detect whether it comprises user credentials for an enterprise server. Regardless of the destination towards which the user credentials are sent, or the purpose thereof, the blockage policy may be block the packets.

Additionally or alternatively, blockage policy may be based on the destination of the packet. As an example, a packet which is being sent towards an enterprise email server may be blocked regardless of its content.

Additionally or alternatively, blockage policy may be based on the origin of the packet. As an example, a packet issued by an app which is identified as a potential threat (e.g., malicious app, non-malicious app infected with a virus, app with a security vulnerability or privacy breach, or the like) may be blocked irrespective of its content or its destination. In such a manner, malicious apps may be prevented from leaking data to their owners, effectively act upon commands provided via a C&C channel, or the like. As another example, packets issued by non-complaint apps (e.g., according to corporate rules) may be blocked from accessing predetermined resources (e.g., corporate related URLs). Non-complaint apps may be identified using white list of complaint apps, a black list of non-complaint apps, or using other methods.

In some exemplary embodiments, a combination of policies may be applied. As one illustrative example, a user may have a private email account using an email provider and a corporate email account that is maintained by a corporate email server. A hybrid blockage policy may prevent any communication to be transmitted in a non-secure channel towards the corporate email server. The hybrid blockage policy may allow transmission of such packets using a secure VPN channel established using a corporate VPN server. In order to prevent disclosure of private information to the employer of the user, the hybrid blockage policy may block packets transmitted towards the server of the email provider if they are transmitted over the VPN channel. Additionally or alternatively, the hybrid blockage policy may block such packets if transmitted in a non-secure channel in case of a potential risk. The blockage policy may, however, allow transmission of packets accessing other servers without interruption. As an example, the policy may allow accessing sites such as google.com, yahoo.com. cnn.com, or the like, but prevent accessing other sites such as gmail.com and an internal corporate website.

Figure 2A:
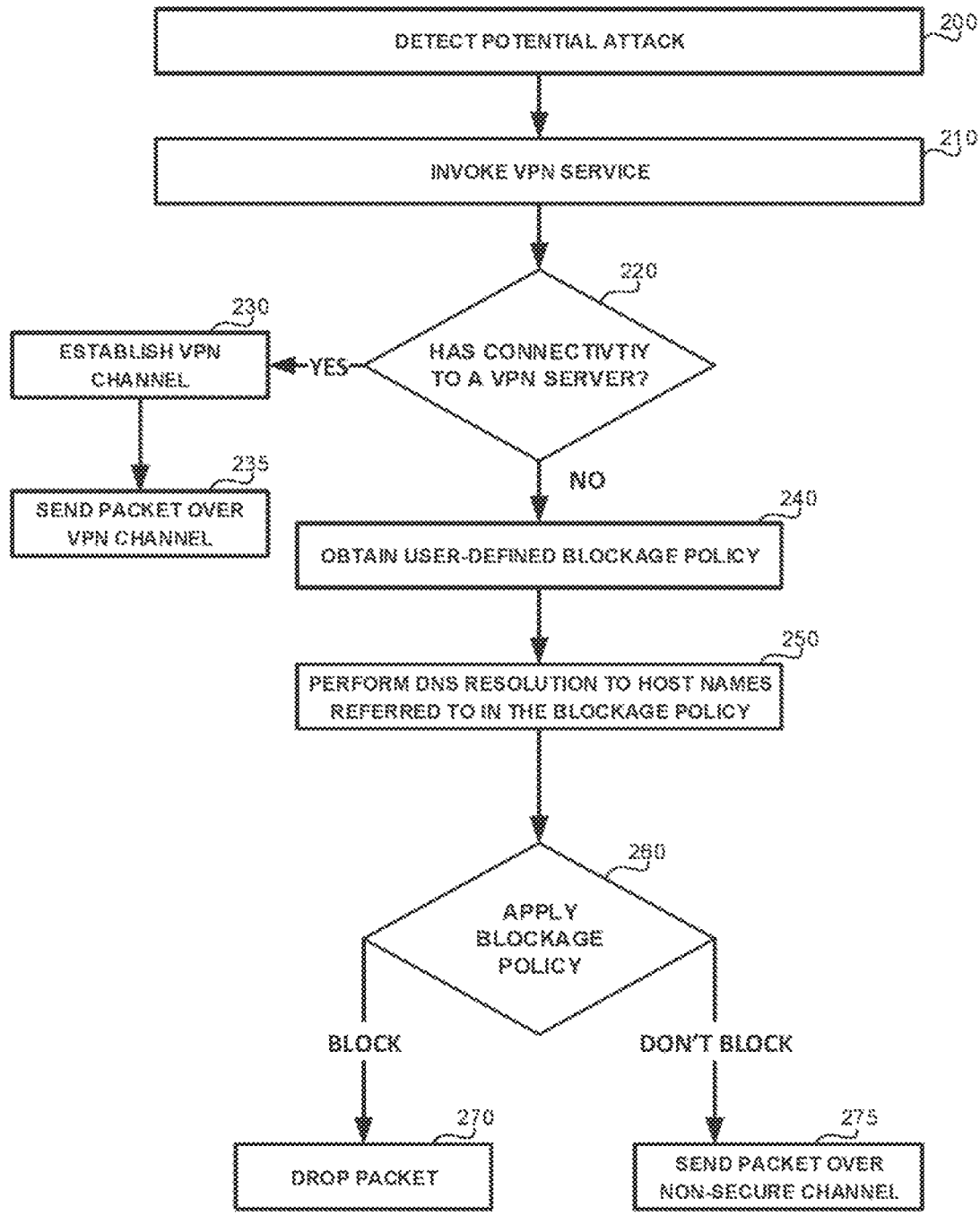
FIG. 2A-2E show flowchart diagrams of methods, in accordance with some exemplary embodiments of the disclosed subject matter.

Referring now to FIG. 2A showing a flowchart diagram of a method, in accordance with some exemplary embodiments of the disclosed subject matter.

On Step 200, a potential risk may be detected. The potential risk may be associated with the local network to which the computing device, such as 120 of FIG. 1, is connected. In some exemplary embodiments, the potential risk may be detected using a probing software executed by the device. Additionally or alternatively, the risk may be detected by an external probe while the device is connected, or alternatively prior to the connection of the device to the network. In some cases, past detections may be used to evaluate a potential risk level. The potential risk may be caused by an actual threat, such as a malicious device performing Man-In-The-Middle (MITM) attacks. Additionally or alternatively, the potential risk may be a false positive risk, such as risk factor that is identified but is not associated with an actual attack.

On Step 210, a VPN service local to the device may be invoked. The VPN service may be executed by the device. In some exemplary embodiments, the VPN service may be implemented using a standard API of any generic VPN service useful in the operating system of the device.

On Step 220, the VPN service may determine whether there's connectivity to a predetermined VPN server. Connectivity issues may occur due to various reasons, such as but not limited to lack of any connectivity external to the local network (e.g., no Internet connection), blocking of Internet connectivity until user authentication or other login procedures are performed, malicious intervention attempting to disrupt operation (e.g., malicious device blocking connectivity to VPN server to prevent the use of a secure communication channel), the VPN server malfunctioning or being disconnected, or the like.

In case there the VPN server is accessible, the device may connect thereto and establish a secure VPN channel (Step 230). Subsequently, any outgoing packet may be sent over the secure VPN channel (Step 235).

In case the VPN server is not accessible, no secure VPN channel may be established. Steps 240-275 may be performed.

In some exemplary embodiments, a plurality of alternative VPN servers may be examined to provide for an alternative for the VPN server having the connectivity issues. Step 220 may be repeatedly performed for each such alternative until one alternative succeeds and Steps 230-235 are performed or until all alternative are determined to be unavailable, and Steps 240-275 are performed.

On Step 240, a blockage policy may be obtained. The blockage policy may be locally retained in the memory of the device. In some exemplary embodiments, the blockage policy may be updated periodically from an external source via a communication channel. The blockage policy may be user-defined and comprising blocking rules. Each blocking rule may include, for example, a target Internet Protocol (IP) address or other target address of the packet, a content of the packet, a protocol employed by the packet, a combination thereof, or the like. The blocking rule may define a threat level in which each blocking rule is active. In some exemplary embodiments, the user-defined blockage policy may be defined by the user of the device, by an IT professional of an organization owning the device or of which the user is a member, a combination thereof, or the like. Each blocking rule may be independently defined. As an example, the blockage policy may be a hybrid policy enforcing corporate policy defined by an IT professional and private policy defined by the user of the device.

In some exemplary embodiments, the blockage policy may refer to host names. For example, a blocking rule may define that packets transmitted towards the host name "gmail.com" be blocked, if transmitted in HTTP instead of HTTP Secure (HTTPS). Additionally or alternatively, if a threat of SSL decryption is determined, packets transmitted towards "gmail.com" may be blocked even if sent via HTTPS. In some exemplary embodiments, the packet itself may not identify the host name to which it should be transmitted. Instead, the host name may have been previously resolved and translated to an IP address based on a DNS server. The IP address of the same host name may be different in different circumstances. As an example, the DNS server may provide different IP addresses at different times to implement load balancing. As another example, mirror hosts may be used at different geographic locations such that the same host may be represented by different machines in different locations. As yet another example, DNS spoofing attack may attempt to redirect traffic to a different, malicious, machine.

In some exemplary embodiments, the generic API of a VPN service may define that the packet to be routed using the VPN be defined using an IP address and without indicating the host name. As a result, a VPN service implementing the API may handle the packet while being oblivious to and unaware of the original host name and being informed only of the resolved IP address thereof.

On Step 250, DNS resolution to host name may be performed using the same DNS server which was used for resolving the host name used in the packet. Based on the DNS resolution one or more IP addresses of the host name, according to the DNS server may be obtained.

Step 250 may be performed repeatedly before applying the blockage policy for each relevant host name appearing in a blocking rule. In some exemplary embodiments, the same host name may be resolved repeatedly by the same DNS server at different times to ensure the IP address has not changed. In some exemplary embodiments, in order to ensure that even if the IP address is changed not a single packet slips through the cracks, DNS resolution may be performed each time and before analyzing each packet. Additionally or alternatively, DNS resolution may be performed when the device connects to a network and may be periodically re-performed to update the IP address, in a manner which is independent of the specific packet that is sent and of the packet inspection process.

On Step 260, the blockage policy is applied. The device may implement the blockage policy and determine whether one of the blocking rules applies and is in effect. If the blockage policy indicates that the packet should be blocked, Step 270 may be performed and the packet may be dropped. In case the blockage policy does not indicate that the packet is to be blocked, Step 275 may be performed and the packet may be sent over a non-secure channel.

Figure 2B:
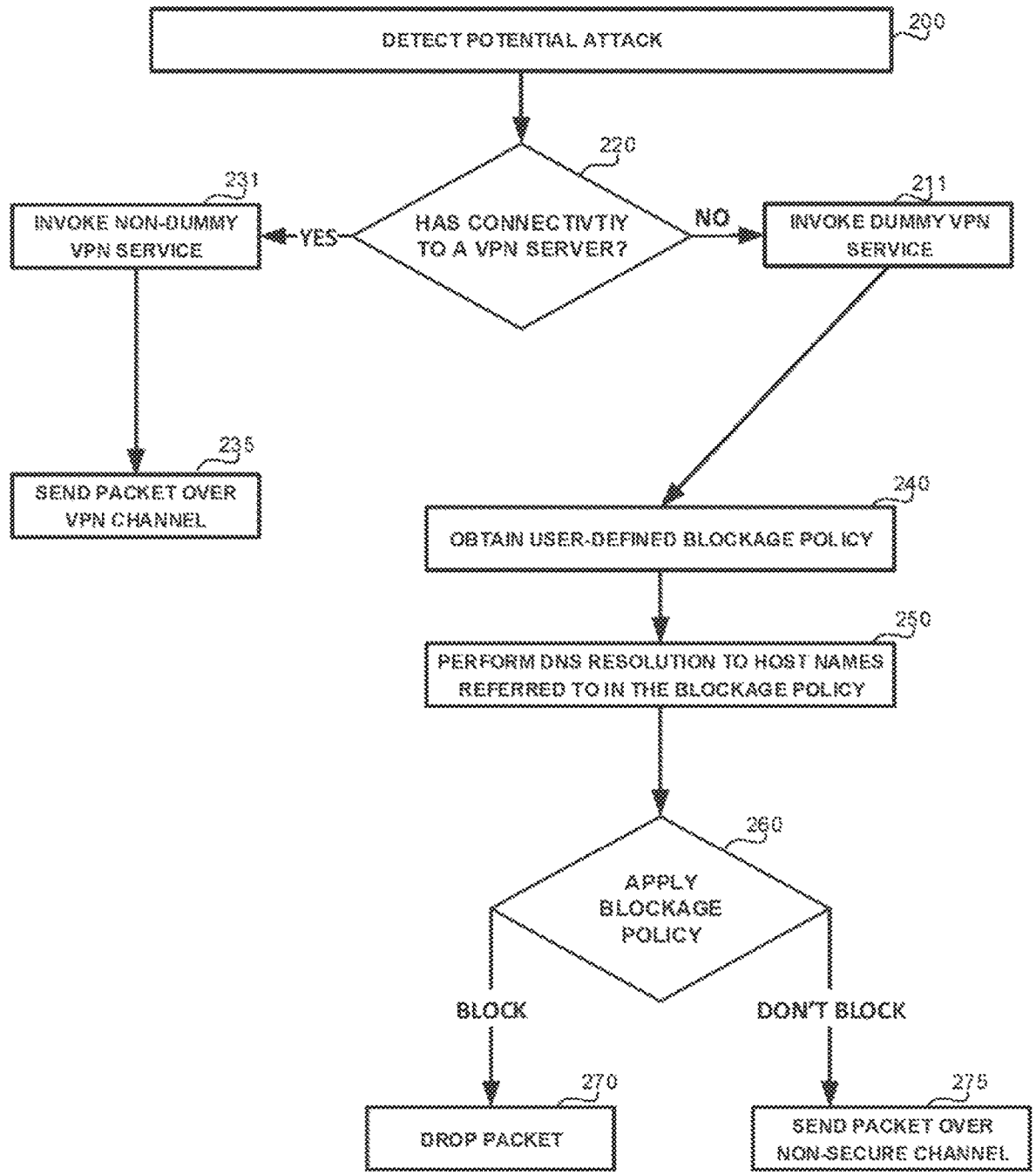

Referring now to FIG. 2B showing a flowchart diagram of a method, in accordance with some exemplary embodiments of the disclosed subject matter.

In FIG. 2, the connectivity determination is performed externally to any specific VPN service. In case there is connectivity to a VPN server (Step 220), a non-dummy VPN service is invoked (Step 231). The non-dummy VPN service is a local VPN service that is configured to establish a VPN connection, as is customary for a VPN service. Once the VPN channel is established, the packet is sent over the VPN channel (Step 235).

In case there is no connectivity to a VPN server, a local dummy VPN service is invoked (Step 211). The dummy VPN service may be a service implementing an API of a generic VPN service, but not configured to establish a VPN channel. The dummy VPN service may be configured to apply a blockage policy (Steps 240-260), and allow packets to be transmitted over non-secure channel or be dropped based on such blockage policy (Steps 270 or 275).

Figure 2C:
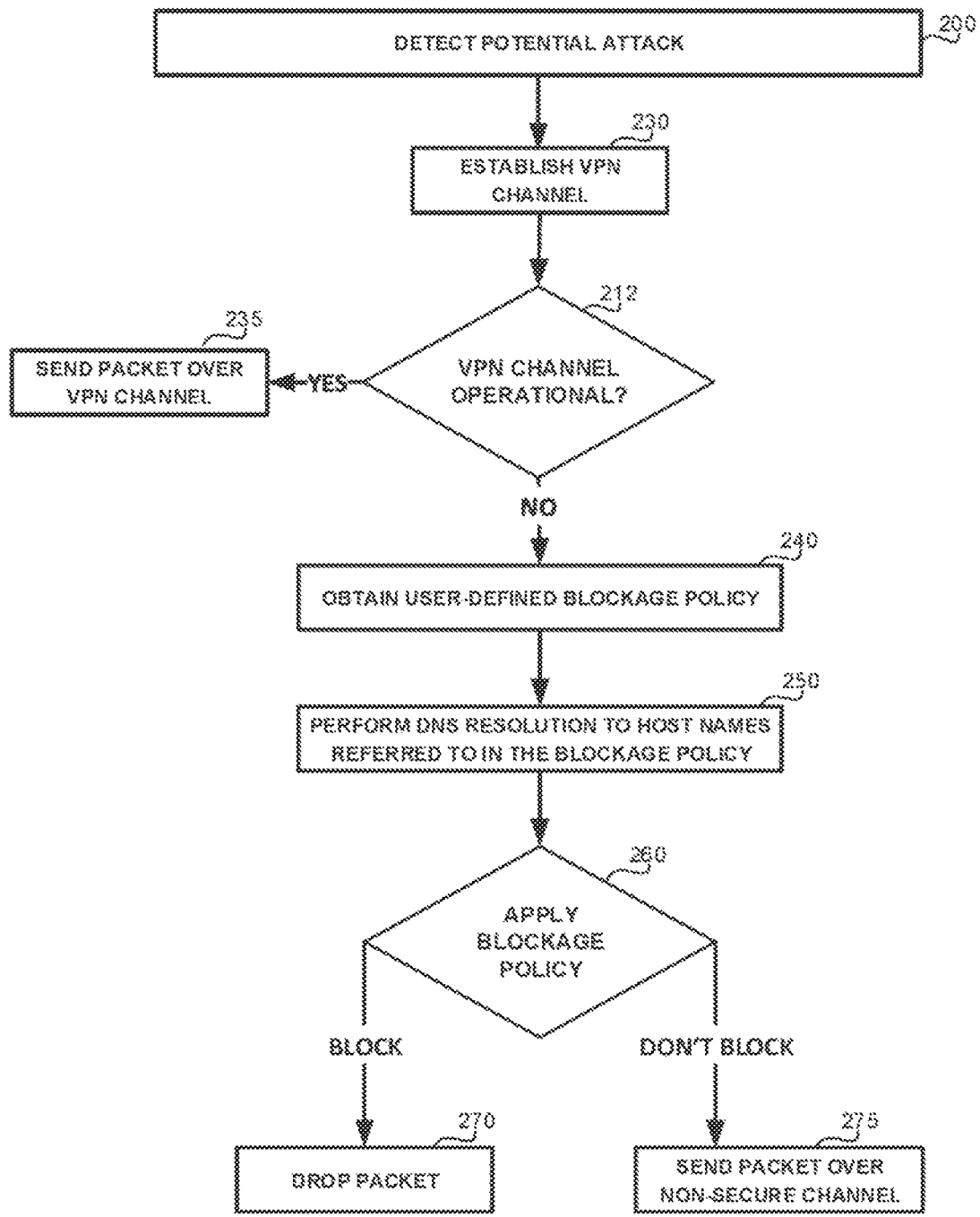

Referring now to FIG. 2C showing a flowchart diagram of a method, in accordance with some exemplary embodiments of the disclosed subject matter. In FIG. 2C, a VPN channel is initially established (Step 230), optionally in response to a detection of a potential attack. The VPN channel may be established by invoking a non-dummy VPN service.

On Step 212, a determination whether the VPN channel is operational may be performed. In some exemplary embodiments, there may be a delay between an attempt to establish the VPN channel commences and until the VPN channel is operational. The delay may be caused by various factors, such as but not limited to communications delay, background noise corrupting packets, or the like. If the VPN channel is operational, the VPN channel may be utilized to send the packet (Step 235) and potentially any packet that follows. Alternatively, if the VPN channel is not yet operational, and the device does not delay communications until the VPN becomes operational, a blockage policy may be implemented to determine how to handle the packet in the intermean (Steps 240-260). If the blockage policy so indicates, such as in view of the packet comprising potentially confidential information, the packet may be blocked (Step 270). Alternatively, the blocking policy may allow the packet to be transmitted in the non-secure channel (Step 275).

In some exemplary embodiments, additional packets to be transmitted may be received and handled in Steps 212, 240-260, 270 or 275 until such time that the VPN channel becomes operational. At such time, the VPN channel may be used to transmit all future packets. In some exemplary embodiments, blocked packets may be entered into a buffer and once the VPN channel is operational transmitted over the VPN channel.

Figure 2D:
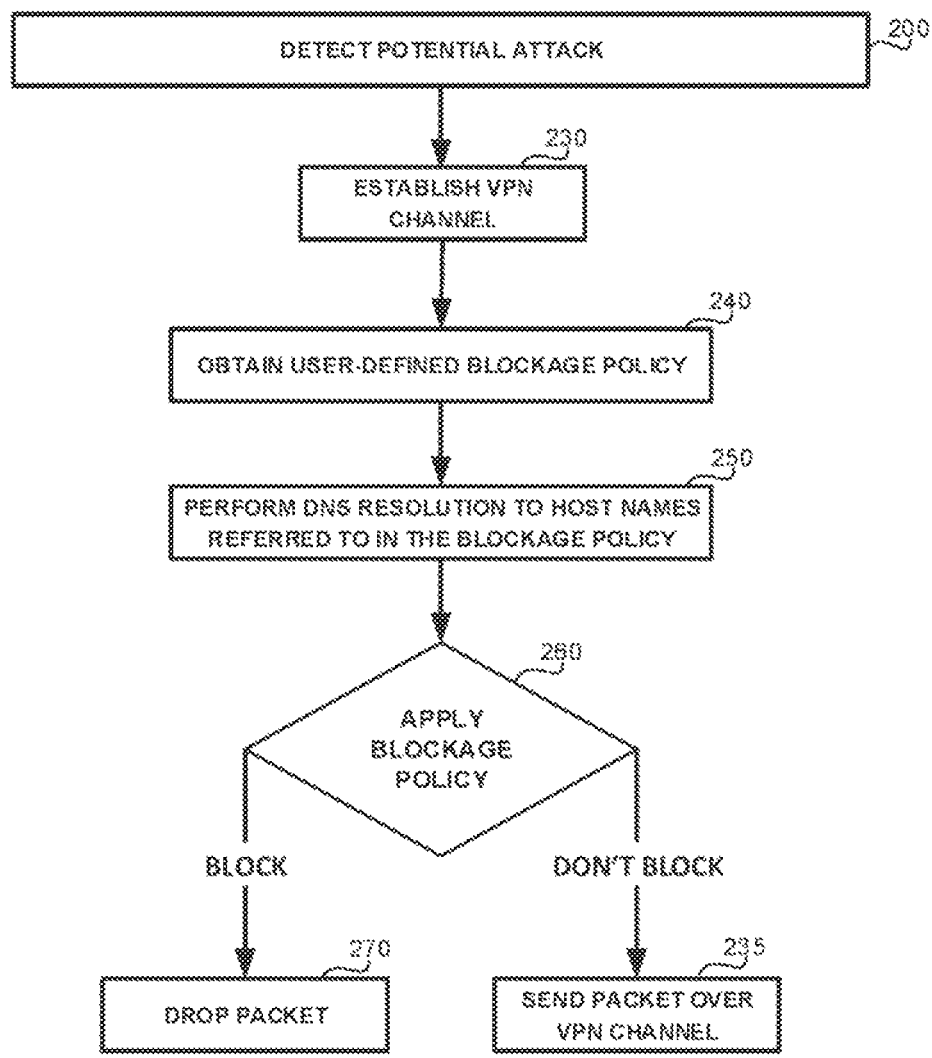

Referring now to FIG. 2D showing a flowchart diagram of a method, in accordance with some exemplary embodiments of the disclosed subject matter.

On Step 200, a potential attack is detected and in response a VPN channel is established (Step 230), optionally using a VPN service that is local to the device. However, some information may be confidential and the user may wish to avoid disclosure to the VPN provider. The VPN provider may be, for example, an employer of the user, a service provider providing IT services, or the like. The blockage policy may be obtained and applied (Steps 240-260) to determine whether to drop the packet (Step 270) or, if the packet is not deemed confidential, allow it to be sent over the secure VPN channel (Step 235).

Figure 2E:
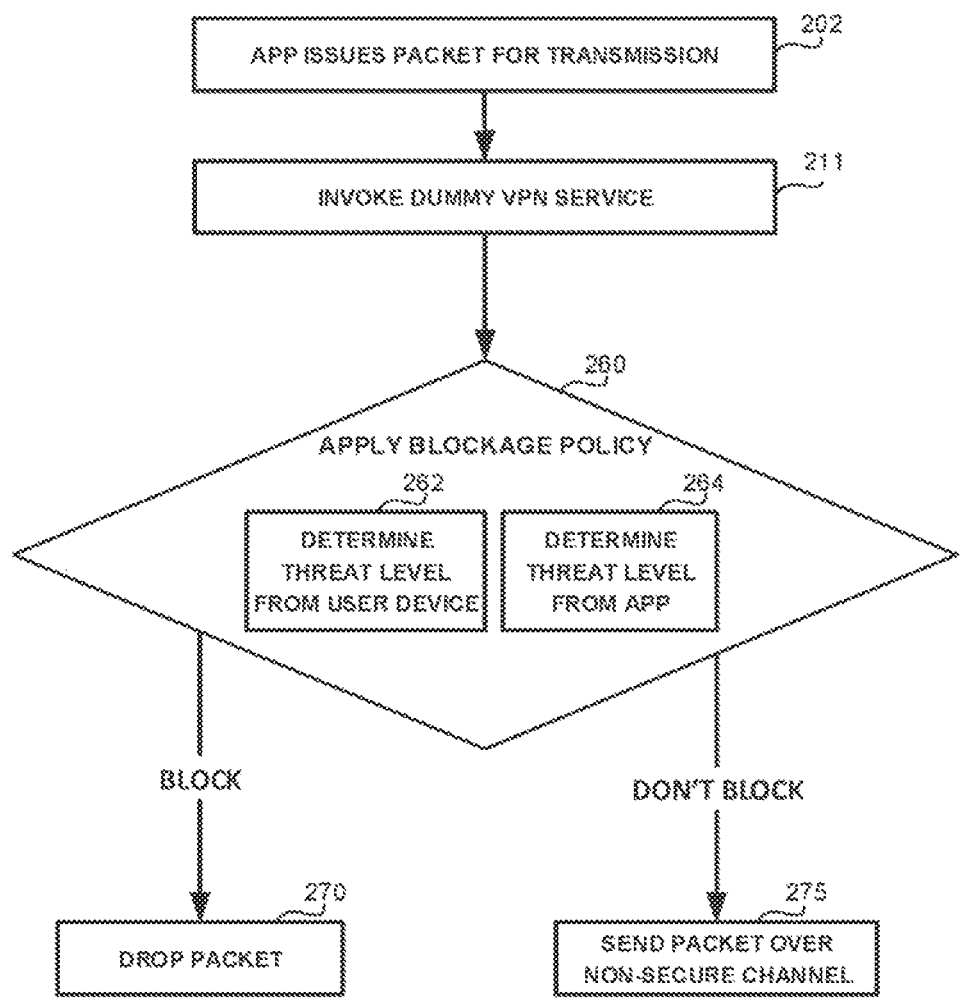

Referring now to FIG. 2E showing a flowchart diagram of a method, in accordance with some exemplary embodiments of the disclosed subject matter.

On Step 202, an app issues a packet for transmission over the network. The transmission is handled via a dummy VPN service that is invoked (Step 211). The dummy VPN service is configured to implement selective access/blockage policy for the packet. In some exemplary embodiments, the dummy VPN service may or may not be configured to establish a secure VPN channel in case it determines that the packet should be allowed to be transmitted.

On Step 260, the selective blockage policy is applied. In some exemplary embodiments, a threat level may be estimated or determined.

The threat level may be determined based on the user device (262). For example, some devices may not comply with corporate regulations and therefore may be viewed as having a higher threat level than others. Additionally or alternatively, the threat level from the device may be estimated based on monitored activity of the user operating the device; based on the estimation whether the device is operated by a different user than an authorized user (e.g., a spouse of the user) which may be determined using biometric identification methods, based on anomalous behavior detection, or the like; based on installed apps on the device, such as whether an infected app or an app with a known security breach is installed thereon; or the like.

The threat level may be determined based on the app (264). In some exemplary embodiments, some apps may be identified as malicious apps, infected apps, or the like. In such a case, all communications outgoing from such apps may be blocked thereby circumventing malicious activity thereof. Additionally or alternatively, some apps may be known to have security breaches that can be exploited. In such a case, outgoing packets may be selective blocked based on the likelihood that they are associated with an exploitation of the security breach. Similarly, potential privacy issues and unwanted transmission of private data can be prevented. For example, consider LinkedIn™ app, which transmits private calendar meetings upon launch (see: Y. Amit, LinkedOut—A LinkedIn Privacy Issue, dated 06, June 2012, available on www.skycure.com/blog/linkedout-a-linkedin-privacy-issue/, which is hereby incorporated by reference in its entirety). The blockage policy may identify packets associated with such transmission and block them such as based on their destination, timing of packets with respect to the launch of the app, content thereof, or the like.

In some exemplary embodiments, blockage policy may determine to block packets in cases where a threat level is above a threshold. In some exemplary embodiments, packets may be blocked if any particular threat level is above a corresponding threshold. Additionally or alternatively, an overall threat level may be computed and compared to a threshold.

In some exemplary embodiments, some apps may be automatically identified as potentially malicious apps. In response to such determination, a user, such as a user of the device, an IT professional of an organization, or the like, may be notified of the potential threat, such as using an alert notification. The alert notification may be provided such as but not limited to using a push notification to a mobile device of the user, via an email or other electronic message, using a popup message, or the like. The user may act upon the alert notification such as uninstall the app, quarantine the app, or otherwise decommission the app. In some cases, the user may determine that the alert is a false positive notification and manually dismiss the identification. Until the user acts upon the alert (e.g., implementing security response measurement or dismissing a false positive indication), all outgoing packets sent from the app may be blocked. In some exemplary embodiments, the alert notification may be transmitted to several users and only some of which (e.g., IT professionals) may have the authority to dismiss the alert notification.

The above exemplary embodiments exhibit that different blockage policies may be applied at different circumstances: packets to be blocked over non-secure channel are determined using different rules than packets that are to be blocked over the secure channel. Blockage in the intermittent may apply different blocking rules than in case of limited connectivity to the VPN server, or the like. In some exemplary embodiments, the blockage policy may comprise different alternative blockage policies, each applicable at a different situation or scenario.

Figure 3:
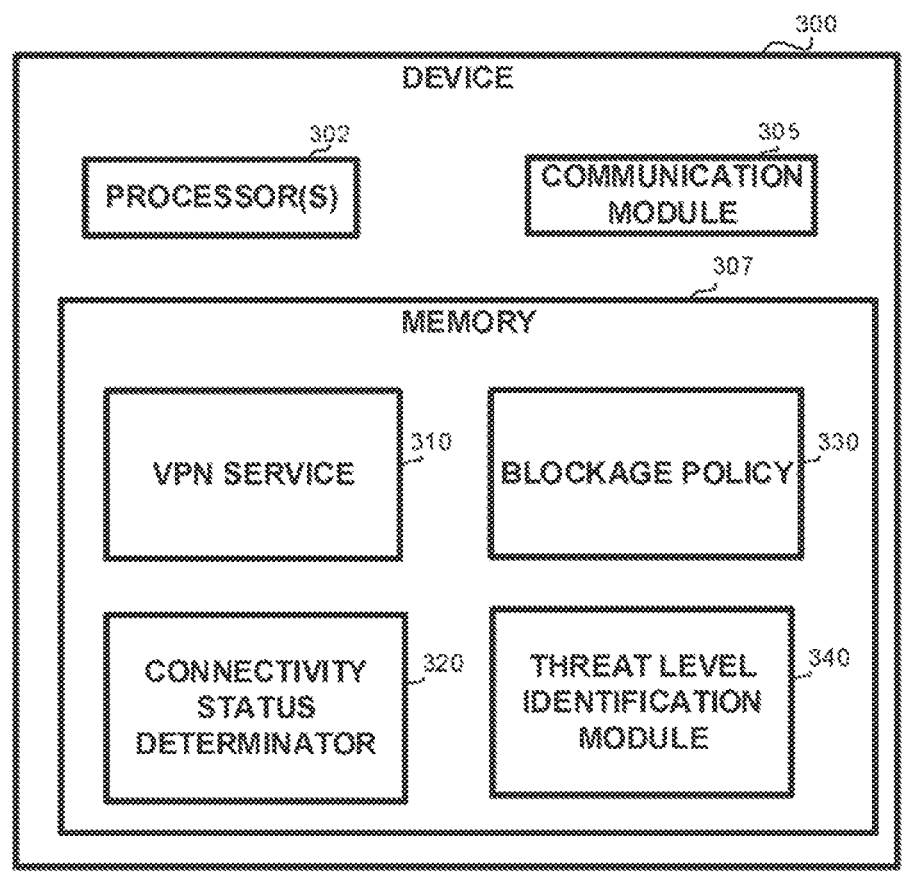
FIG. 3 shows a block diagram of a device, in accordance with some exemplary embodiments of the disclosed subject matter.

Referring now to FIG. 3 showing an apparatus, in accordance with some exemplary embodiments of the disclosed subject matter.

In some exemplary embodiments, Device 300 may be configured to perform the methods in accordance with the disclosed subject matter, such as depicted in FIGS. 2A-2D. Device may be a mobile computing device, a smartphone, a laptop, a tablet, a PDA, a personal computer, or the like. In some exemplary embodiments, Apparatus 300 may be Device 120 of FIG. 1.

Device 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Device 300 or any of it subcomponents.

In some exemplary embodiments of the disclosed subject matter, Device 300 may comprise a Communication Module 305. Communication Module 305 may be utilized to allow Device 300 to connect to other devices, networks, or the like.

In some exemplary embodiments, Device 300 may comprise a Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Device 300.

VPN Service 310 may be a computer program product locally residing within Device 300 and executable thereby. VPN Service 310 may implement an API of a generic VPN service. The API may be dictated by the Operating System (OS) of Device 300. VPN Service 310 may be a dummy VPN Service which is not configured to actually establish a VPN channel in any circumstance. Additionally or alternatively, the VPN service may be a partially dummy VPN service that is configured to establish a VPN channel in some circumstances, and handle traffic in a selective manner when the VPN channel is not established (e.g., because the VPN channel cannot be established, because the VPN channel is not yet functional, or the like).

Connectivity Status Determinator 320 may be a computer program product configured to determine connectivity of Device 300 to a network, such as Internet 115. In some exemplary embodiments, Connectivity Status Determinator 320 may determine connectivity to specific servers, such as a predetermined VPN server that used by VPN service 310. In some exemplary embodiments, VPN Service 310 may be invoked in response to a determination by Connectivity Status Determinator 320 of limited connectivity. In some exemplary embodiments, there may be a plurality of VPN services, such as a dummy VPN service and a non-dummy VPN service. Based on the connectivity, the VPN service may be selected and invoked. For example, in case the VPN server is not reachable, the dummy VPN service may be invoked in order to provide for selective blockage when transmitting packets over a non-secure channel. Alternatively, if the VPN server is reachable, the non-dummy VPN service may be invoked in order to establish a secure VPN channel.

Blockage policy 330 may comprise blocking rules to be applied in determining selective blocking of outgoing packets. Blocking rules may indicate conditions in which a packet is to be blocked such as based on the content of the package, a target host thereof, threat levels, VPN channel availability, or the like.

Threat Level Identification Module (TLIM) 340 may be a computer program product configured to determine a threat level posed to Device 300 by a network to which Device 300 is connected. TLIM 340 may be configured to identify potential threats in a network, such as identifying anomalous behavior, SSL decryption, SSL stripping, content manipulation, Address Resolution Protocol (ARP) Poisoning, application and/or Operating System (OS) vulnerabilities exploitation, fake Wi-Fi network, or the like. Additionally or alternatively, TLIM 340 may determine the threat level based on proving performed by a different module within Device 300, by a different device connected to the same network, or the like. In some exemplary embodiments, TLIM 340 may estimate threat level based on current identified suspicious activity within the network, based on previously identified suspicious activity within the network in the past, combination thereof, or the like. In some exemplary embodiments, VPN Service 310 may be invoked in response to TLIM 340 determining a threat level above a threshold. The level may be provided in binary (i.e., threat/no-threat) or in other scales, such as a number between 0 and 1, where 0 is indicative of no threat and 1 is indicative of the highest level of threat.

Implementation Details

Implementing selective traffic blockage for mobile device may be technically challenging because apps running on mobile devices are restricted to a sandbox that prevents them from impacting other apps running on the device.

In some exemplary embodiments, selective traffic blockage may be implemented using the VPN capabilities available on mobile operating systems for blocking traffic on the device, instead of for their original purpose of routing traffic through a VPN channel.

On iOS™, it may be possible to define a Network Extension which allows the use of a custom VPN protocol. The VPN extension may be configured to receive all packets targeted at certain predefined routes and may have the ability to perform different manipulations on it before directing it to the next network extension in the chain. In some exemplary embodiments, instead of manipulating traffic, the VPN extension may be set to apply the blockage policy and if a blocking decision is determined, drop the packet and avoid passing such packet to the next extension in the chain, thereby blocking it on the device itself.

On Android™, implementing a VPN Service can provide similar capabilities by filtering packets targeted at specific hosts and prevent them from being sent.

A technical challenge may be that both iOS™ Network Extension and Android™ VPN Service can perform different operations based on the target IP of a network request, but do not provide any indication of the target host. When a user configured "www.facebook.com" as a host he would like to protect, this host usually consists of multiple IP addresses, which are sometimes determined based on geolocation aspects. In some exemplary embodiments, a probe may be configured as part of an app installed on the device that resolves each protected host to an IP address using a DNS query before starting the protection.

In some exemplary embodiments, the implementation may take into consideration the configuration of captive networks that redirect all traffic to a default gateway. In some exemplary embodiments, the blockage policy may be manually or automatically reviewed to ensure that the default gateway is not blocked, allowing the user to pass the captive portal and gain Internet access. In some exemplary embodiments, a list of known default gateways may be obtained and the blocking rules may be reviewed to ensure that none of which refers to such default gateway. Additionally or alternatively, a dedicated computer program, such as a probing app, may be configured to attempt sending different outgoing packets. The packets transmitted by the probing app may be configured to always pass through the blockage policy and not be blocked thereby. Based on the responses received to the packets, it may be deduced that a default gateway is present. The blockage policy may be modified automatically to allow transmission of packets to the default gateway. In some exemplary embodiments, the automatic modification may be for a limited amount of time, such as five minutes, an hour, as long as the device is connected to the same network, or the like. In some exemplary embodiments, the modification of the blockage policy may be to disable each blocking rule that refers to the default gateway or IP addresses thereof. In some exemplary embodiments, the modification to the blockage policy may be semi-automatic and may require user action allowing the disabling of a blocking rule.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for selectively blocking network traffic generated by one or more applications executing on a mobile computing device, comprising:
    obtaining, by a local virtual private networking (VPN) service retained on local memory of the mobile computing device and executing on the mobile computing device as a network extension interposed between the one or more applications executing on the mobile computing device and a network interface of the mobile computing device, an outgoing packet, wherein:
        the outgoing packet is obtained from an application executing in a sandboxed environment on the mobile computing device,
        the application executing in the sandboxed environment on the mobile computing device comprises an application that is executed in isolation from other applications executing on the mobile computing device, and
        the outgoing packet is designated for transmission by the mobile computing device towards an external device;
    identifying, by the local VPN service, an action to take with respect to the outgoing packet based on a blockage policy configured to selectively block outgoing packets, wherein the action comprises one of:
        blocking transmission of the outgoing packet where the outgoing packet includes sensitive data or the outgoing packet is generated by a potentially malicious or non-compliant application,
        allowing transmission of the outgoing packet through an active VPN connection with a VPN server associated with a same organization as the mobile computing device, where the outgoing packet is directed to computing resources associated with the same organization,
        queuing the outgoing packet for transmission until a VPN connection is established with the VPN server associated with the same organization as the mobile computing device, where the outgoing packet is directed to the computing resources associated with the same organization as the mobile computing device and the VPN connection is not currently established with the VPN server associated with the same organization as the mobile computing device, or
        allowing transmission of the outgoing packet over an unsecured channel where the outgoing packet is directed to resources other than the computing resources associated with the same organization as the mobile computing device; and
    taking, by the local VPN service, the identified action with respect to the outgoing packet so as to selectively block transmission of the outgoing packet.

2. The method of claim 1, wherein the local VPN service comprises a service that is not configured to establish a VPN channel with an external destination.

3. The method of claim 1, wherein the blockage policy is configured to selectively block the outgoing packet based on at least one of:
    a content of the outgoing packet;
    a target destination of the outgoing packet; and
    a computer application transmitting the outgoing packet.

4. The method of claim 1, further comprising:
    detecting a potential threat to the mobile computing device, wherein the blockage policy is applied in response to detecting the potential threat.

5. The method of claim 1, further comprising:
detecting, by the local VPN service, whether a remote VPN server is accessible over a network; and
in response to detecting that the remote VPN server is inaccessible, applying, by the local VPN service, the blockage policy.

6. The method of claim 1, further comprising:
determining, by the local VPN service, a blocking decision based on the blockage policy; and
determining whether to transmit the outgoing packet based on the blocking decision.

7. The method of claim 6, wherein the determination of whether to transmit the outgoing packet comprises:
deciding, by the local VPN service, to allow transmission of the outgoing packet based on the blocking decision being to not block the outgoing packet; or
deciding, by the local VPN service, to prevent transmission of the outgoing packet based on the blocking decision being to block the outgoing packet.

8. The method of claim 1, further comprising:
detecting, by the local VPN service, that a VPN server is accessible over a network;
in response to the detection that the VPN server is accessible, establishing, by the local VPN service, a VPN channel between the mobile computing device and the VPN server using the VPN server; and
based on the establishment of the VPN channel, halting application, by the local VPN service, of the blockage policy and allowing packets to be transmitted via the VPN channel.

9. The method of claim 1, further comprising:
determining an estimated threat level from an application transmitting the outgoing packet; and
selectively blocking the outgoing packet based on the estimated threat level exceeding a threshold threat level.

10. The method of claim 9, wherein:
the application transmitting the outgoing packet is configured to perform a malicious activity; and
the blockage policy is configured to selectively block the outgoing packet based on an identification of the application as configured to perform the malicious activity.

11. The method of claim 9, wherein the application comprises one of:
a malicious application;
an application infected with a virus; or
a computer application having a vulnerability that is exploitable for malicious activity.

12. The method of claim 1, further comprising:
automatically identifying, by the local VPN service, an application as a potential threat; and
transmitting, by the local VPN service, an alert notification for a user based on the automatic identification;
wherein the blockage policy is configured to prevent the application from transmitting any outgoing packets until an action is taken in response to the alert notification.

13. The method of claim 1, further comprising:
determining, by the local VPN service, an estimated threat level from the mobile computing device; and
selectively blocking outgoing packets from the mobile computing device based on the estimated threat level exceeding a threshold threat level.

14. The method of claim 13, wherein the estimated threat level is determined based on whether the mobile computing device is compliant with a set of security rules.

15. A method for selectively blocking network traffic generated by one or more applications executing on a mobile computing device, comprising:
detecting that an application executing in a sandboxed environment on the mobile computing device is attempting to transmit an outgoing packet, wherein the application executing in the sandboxed environment on the mobile computing device comprises an application that is executed in isolation from other applications executing on the mobile computing device;
in response to the detection, invoking a local Virtual Private Network (VPN) service executing on the mobile computing device as a network extension interposed between the one or more applications executing on the mobile computing device and a network interface of the mobile computing device, wherein the local VPN service is configured to apply a blockage policy and wherein the local VPN service provides an Application Programming Interface (API) for the local VPN service;
identifying, by the local VPN service, an action to take with respect to the outgoing packet based on the blockage policy, wherein the action comprises one of:
blocking transmission of the outgoing packet where the outgoing packet includes sensitive data or the outgoing packet is generated by a potentially malicious or non-compliant application,
allowing transmission of the outgoing packet through an active VPN connection with a VPN server associated with a same organization as the mobile computing device where the outgoing packet is directed to computing resources associated with the same organization,
queuing the outgoing packet for transmission until a VPN connection is established with the VPN server associated with the same organization as the mobile computing device, where the outgoing packet is directed to the computing resources associated with the same organization as the mobile computing device and the VPN connection is not currently established with the VPN server associated with the same organization as the mobile computing device, or
allowing transmission of the outgoing packet over an unsecured channel where the outgoing packet is directed to resources other than the computing resources associated with the same organization as the mobile computing device; and
taking, by the local VPN service, the identified action with respect to the outgoing packet based on the blockage policy so as to selectively block transmission of the outgoing packet.

16. The method of claim 15, wherein the local VPN service comprises a service that is not configured to establish a VPN channel with an external destination.

17. The method of claim 15, wherein the blockage policy is configured to selectively block the outgoing packet based on the application.

18. The method of claim 15, wherein the blockage policy is configured to selectively block the outgoing packet based on an estimated threat level associated with the application.

19. The method of claim 15, further comprising:
identifying a potential threat from the application, wherein the blockage policy is configured to block all outgoing packets generated by the application while the potential threat is present.

20. The method of claim 15, further comprising:
identifying a potential threat from the application; and
providing an alert notification for informing a user of the potential threat from the application,
wherein the blockage policy is configured to block all outgoing packets generated by the application until a response to the alert notification is received.

21. The method of claim 20, wherein the response comprises an indication that the application has been decommissioned.

22. The method of claim 20, wherein the response comprises instructions to dismiss the alert notification, and wherein the blockage policy is configured to transmit outgoing packets generated by the application after dismissing the alert notification.

23. The method of claim 15, wherein the blockage policy is configured to selectively block the outgoing packet based on an estimated threat level associated with the mobile computing device.

24. The method of claim 15, further comprising:
determining a compliance level of the mobile computing device with one or more rules of an organization, wherein the blockage policy is configured to selectively block the outgoing packet based on the determined compliance level.

25. A mobile computing device, comprising:
a local memory; and
a processor coupled to the local memory and configured to perform an operation for selectively blocking network traffic generated by one or more applications executing in a sandboxed environment on the mobile computing device, the operation comprising:
obtaining, by a local virtual private networking (VPN) service retained on the local memory of the mobile computing device and executing as a network extension interposed between the one or more applications executing in the sandboxed environment on the mobile computing device and a network interface of the mobile computing device, an outgoing packet, wherein:
the applications executing in the sandboxed environment on the mobile computing device comprise applications that are executed in isolation from other applications executing on the mobile computing device, and
the outgoing packet is designated for transmission by the mobile computing device towards an external device;
identifying, by the local VPN service, an action to take with respect to the outgoing packet based on a blockage policy configured to selectively block outgoing packets, wherein the action comprises one of:
blocking transmission of the outgoing packet where the outgoing packet includes sensitive data or the outgoing packet is generated by a potentially malicious or non-compliant application,
allowing transmission of the outgoing packet through an active VPN connection with a VPN server associated with a same organization as the mobile computing device where the outgoing packet is directed to computing resources associated with the same organization,
queuing the outgoing packet for transmission until a VPN connection is established with the VPN server associated with the same organization as the mobile computing device, where the outgoing packet is directed to the computing resources associated with the same organization as the mobile computing device and the VPN connection is not currently established with the VPN server associated with the same organization as the mobile computing device, or
allowing transmission of the outgoing packet over an unsecured channel where the outgoing packet is directed to resources other than the computing resources associated with the same organization as the mobile computing device; and
taking, by the local VPN service, the identified action with respect to the outgoing packet so as to selectively block transmission of the outgoing packet.

26. A mobile computing device, comprising:
a processor configured to perform an operation for selectively blocking network traffic generated by one or more applications executing in a sandboxed environment on the mobile computing device, the operation comprising:
detecting that an application executing in the sandboxed environment on the mobile computing device is attempting to transmit an outgoing packet, wherein the application executing in the sandboxed environment on the mobile computing device comprises an application that is executed in isolation from other applications executing on the mobile computing device;
in response to the detection, invoking a local Virtual Private Network (VPN) service executing on the mobile computing device as a network extension interposed between the one or more applications executing on the mobile computing device and a network interface of the mobile computing device, wherein the local VPN service is configured to apply a blockage policy and wherein the local VPN service provides an Application Programming Interface (API) for a VPN service;
identifying, by the local VPN service, an action to take with respect to the outgoing packet based on the blockage policy, wherein the action comprises one of:
blocking transmission of the outgoing packet where the outgoing packet includes sensitive data or the outgoing packet is generated by a potentially malicious or non-compliant application,
allowing transmission of the outgoing packet through an active VPN connection with a VPN server associated with a same organization as the mobile computing device where the outgoing packet is directed to computing resources associated with the same organization,
queuing the outgoing packet for transmission until a VPN connection is established with the VPN server associated with the same organization as the mobile computing device, where the outgoing packet is directed to the computing resources associated with the same organization as the mobile computing device and the VPN connection is not currently established with the VPN server associated with the same organization as the mobile computing device, or
allowing transmission of the outgoing packet over an unsecured channel where the outgoing packet is directed to resources other than the computing resources associated with the same organization as the mobile computing device; and taking, by the local VPN service, the identified action with respect to the outgoing packet based on the blockage policy so as to selectively block transmission of the outgoing packet; and a memory coupled to the processor.

\* \* \* \* \*

UNITED STATES PATENT AND TRADEMARK OFFICE
CERTIFICATE OF CORRECTION

PATENT NO. : 10,594,736 B1
APPLICATION NO. : 16/015483
DATED : March 17, 2020
INVENTOR(S) : Yair Amit et al.

Page 1 of 1

It is certified that error appears in the above-identified patent and that said Letters Patent is hereby corrected as shown below:

On the Title Page

In Column 1, item (63), Related U.S. Application Data, Line 2, delete "Nov. 8, 2016" and insert -- Nov. 18, 2016 --, therefor.

Signed and Sealed this
Seventh Day of July, 2020

Andrei Iancu
*Director of the United States Patent and Trademark Office*